United States Patent
D'Ouince et al.

(10) Patent No.: US 7,175,344 B2
(45) Date of Patent: Feb. 13, 2007

(54) DEVICE FOR THE PROTECTION OF A PROBE JOINED TO AN EXTERNAL WALL OF AN AIRCRAFT

(75) Inventors: Arnaud D'Ouince, Toulouse (FR); Valerie Brivet, Leguevin (FR)

(73) Assignee: Airbus France, Toulouse (FR)

( * ) Notice: Subject to any disclaimer, the term of this patent is extended or adjusted under 35 U.S.C. 154(b) by 105 days.

(21) Appl. No.: 11/017,620

(22) Filed: Dec. 20, 2004

(65) Prior Publication Data

US 2005/0152434 A1    Jul. 14, 2005

(30) Foreign Application Priority Data

Dec. 19, 2003    (FR) .................................. 03 51148

(51) Int. Cl.
*G01K 1/00*    (2006.01)
(52) U.S. Cl. ...................................... 374/208; 374/163
(58) Field of Classification Search ................ 374/148, 374/138
See application file for complete search history.

(56) References Cited

U.S. PATENT DOCUMENTS

| | | | |
|---|---|---|---|
| 2,532,316 A | 12/1950 | Larkin | |
| 2,970,475 A * | 2/1961 | Werner | ........................ 374/138 |
| 3,080,817 A | 3/1963 | Robinson et al. | |
| 3,739,638 A * | 6/1973 | White et al. | ................... 73/181 |
| 3,824,853 A * | 7/1974 | Mahon | ........................ 73/181 |
| 4,170,899 A * | 10/1979 | Fujita et al. | ............. 73/170.08 |
| 5,312,152 A | 5/1994 | Woebkenberg et al. | |
| 5,938,147 A | 8/1999 | DeGroff | |
| 6,612,521 B1 * | 9/2003 | DeGroff | ....................... 244/1 R |
| 2002/0023484 A1 * | 2/2002 | Demay et al. | ........... 73/170.02 |
| 2004/0218659 A1 * | 11/2004 | Wellman et al. | ............. 374/121 |

FOREIGN PATENT DOCUMENTS

| | | |
|---|---|---|
| DE | 28 02 570 A | 7/1978 |
| WO | WO 00/04336 A | 1/2000 |

\* cited by examiner

*Primary Examiner*—Diego Gutierrez
*Assistant Examiner*—Mirellys Jagan
(74) *Attorney, Agent, or Firm*—Patterson, Thuente, Skaar & Christensen, P.A.

(57) ABSTRACT

The invention relates to a device for the protection of a probe joined to a wall of an aircraft. Detachable means for fastening to the wall of the protection device are sensitive to a modification of a temperature of the probe. For example, the fastening means are made of a shape memory material. A rise in temperature enables a deformation of the fastener means and a separation of the device from the wall. It is also possible to make the fastener means out of magnetostrictive or polarizable material in order to separate the protection device when the fastener means are subjected to a magnetic field. Thus, the fastener means may comprise a polarizable pin that withdraws from a housing made on a through-hole unit when it is subjected to the magnetic field generated by an electromagnet.

13 Claims, 2 Drawing Sheets

DEVICE FOR THE PROTECTION OF A PROBE JOINED TO AN EXTERNAL WALL OF AN AIRCRAFT

RELATED APPLICATION

The present application claims priority to French Application No. 03 51148 filed Dec. 19, 2003.

BACKGROUND OF THE INVENTION

1. Field of the Invention

An object of the invention is a device for the protection of a part joined to a wall. More specifically, an object of the invention is a device for the protection of a probe fixed to an external wall of an aircraft. The protection device is used to isoiate the probe from external phenomena. The invention more particularly relates to detachable means for fastening the device for the protection of said probe to the wall of the aircraft.

It is an aim of the invention to provide a protection device for the temporary and efficient isolation of a probe from exterior elements. It is another aim of the invention to enable an automatic removal of the protection device at an early stage of take-off by the aircraft.

Aircraft are provided with numerous probes positioned on their external wall. The probes may thus be in contact with exterior elements that have to be taken into account when the aircraft take off. For example, these probes are wind-speed probes, namely, probes used to measure the speed of the air and external turbulence. In particular, known wind-speed probes include Pitot probes, which are apparatuses used to measure the speed of the aircraft relative to the air. Pitot tubes take account of the aircraft's inherent speed combined with a wind speed. There also exist thermometric ambience probes used to measure temperature external to the aircraft, manometric probes used to measure air pressure, and clinometrical probes used to measure an angle of incidence or side-slip angle of the aircraft. All these probes have to be in contact with air in order to operate. However, when the aircraft is on the ground, these probes must be protected from certain types of external environment. Indeed, rain, snow, sand, dust, insects etc. may damage the probes.

2. Description of the Prior Art

In the prior art, therefore, each probe is covered with a protective cover when the aircraft is on the ground for at least a few hours. The protective cover at least partially covers the probe, in order to isolate it from rain, wind etc, when the aircraft is on the ground. The protective covers currently used are placed and removed by hand.

Before the aircraft takes off, the protective cover must imperatively be removed. Indeed, most of the probes positioned on the external wall of the aircraft are used to measure the external parameters which must necessarily be taken into account to enable the aircraft to take off. If the protective covers are not removed, the probes cannot be in contact with the exterior elements, and therefore cannot measure the parameters. Take-off is then generally impossible or dangerous because the information provided by the probe is then erroneous.

Furthermore, many protective covers are made of plastic. When an aircraft engine starts up, the probes start getting heated. The temperature of the probes can then rise to above 200° C. If the protective covers are not removed, there is a risk of their melting on the probes, and thus irretrievably damaging them.

At present, since the protective covers are removed by hand, it is possible that certain protective covers may be overlooked on the wall of the aircraft and cause the above-mentioned damage.

In the invention, it is sought to resolve the above-mentioned problems by proposing a system for the automatic removal of the protective covers in the event of oversight.

SUMMARY OF THE INVENTION

The protective covers according to the invention may be fixed and removed mechanically and by hand from the wall of the aircraft carrying the probes to be protected. However, if a protective cover is overlooked on the wall of the aircraft when said aircraft has to take off, the protective cover is removed automatically at an early stage of take-off by the aircraft. The term "early stage" is understood to mean the starting-up of the first engine or the starting-up of the electrical power supply that heats the probe.

For this purpose, the protective covers of the invention are each provided with one or more detachable fastener means sensitive to temperature in the environment of the probe. This means that when the temperature of the wall of the aircraft in the vicinity of probe and/or the temperature of the probe itself increases, the protective covers that, for example, have been forgotten on the wall of the aircraft, get automatically separated from said wall.

According to a first embodiment of the invention, it can be planned that the protective covers will get automatically separated from the wall when the temperature of the wall and the temperature around the probes goes beyond a threshold temperature. This threshold temperature is preferably greater than 60° C., in order to prevent any untimely separation of the protective covers when the aircraft is parked in a place where the ground temperature is in the neighborhood of 60° C. Similarly, the threshold temperature is preferably below a temperature at which a material constituting the protective cover starts melting.

The temperature around the probe increases when the probe is supplied with electrical current. Generally, the probe is supplied with electrical current as soon as an engine of the aircraft has started up. Thus, by making the automatic removal of the protection devices depend on an increase in the ambient temperature of the probes that they protect, it will be ensured that all the protective covers are removed at an early stage in the starting-up of the aircraft. Thus, there is no risk of any overlooked protective cover melting on a probe.

For example, the fastener means are suction cups that get attached to the wall of the aircraft by partial vacuum. The suction cups get automatically detached from the external wall of the aircraft as soon as there is a rise in the surrounding temperature of the probe, and hence in the temperature of the wall bearing the probe. Indeed, the partial vacuum created at the position of the suction cups tends to disappear when the wall and suction caps undergo a rise in temperature. However, it may be that such an approach is not always satisfactory. Indeed, depending on the suction caps used and when the aircraft is on the ground for more than 12 hours, the risk of the untimely detachment of the suction caps may increase.

In another exemplary embodiment of the invention, it is possible to use fastener means whose constituent materials are shape memory materials. Shape memory materials are alloys that can be mechanically deformed under cold. These materials recover their initial appearance when they are subjected to a temperature greater than their deformation temperature. This modification of the shape is due to a modification of the crystalline structure of the alloy.

Thus, it may be planned, for example, to make the means for fastening the protective covers out of a nickel-titanium alloy. When the protective cover is placed around the probe, its fastener means are mechanically deformed, in order to give them, for example, a clip shape. It is possible to introduce a part that goes through fastener means in holes made in the wall of the aircraft. The fastener means get clipped into the holes of the wall of the aircraft. The clips or parts that hold the fastener means maintain the protective cover on the wall. When the aircraft has to be started, the protective covers can be unclipped beforehand manually. For example, a pulling force can be exerted on the protective cover.

However, if a protective cover of a probe is forgotten on the wall of the aircraft, said protection device get automatically unclipped when the ambient temperature of the probe increases and exceeds the deformation temperature of the material. Indeed, the fastener means, mechanically deformed in order to form a clip, recover their initial form when the temperature goes beyond the deformation temperature.

The deformation temperature depends on the constituent elements of the alloy used to make the fastener means. For example, it is possible to add another constituent material such as iron, chrome, manganese or aluminum to a titanium-nickel alloy. Thus, the deformation temperature of the shape memory material is reduced. This means that the threshold temperature at which the protective cover gets automatically detached from the aircraft wall is reduced. Conversely, gold or palladium can be added to the nickel-titanium alloy in order to increase the deformation temperature of said alloy. The latter approach is particularly valuable when the aircraft are parked in places where the ground temperature is high. Indeed, in this way, the detachment of the protective covers from the wall is prevented when no take-off is planned for the aircraft. In another example, the shape memory material used may be a copper alloy that costs less than nickel-titanium alloy.

The initial shape of the fastener means, i.e. the shape before mechanical deformation, is such that it does not enable the protection device to be held on the wall of the aircraft. For example, the fastener means initially have a cylindrical shape. A diameter of the cylinder is smaller than a diameter of the holes made on the wall of the aircraft and into which the fastener means are introduced. Thus, the fastener means are no longer held in the holes of the wall when they recover their initial cylindrical shape. The protective cover can then fall to the ground by gravity, and/or the vibrations of the aircraft.

In another embodiment, the holding of the protective cover on the wall of the aircraft can be made to depend directly on a starting of at least one engine of the aircraft or of the probe. In other words, an automatic detachment of the protective cover is associated with a supply of electrical current to an engine or a probe. The supply of electrical current is furthermore responsible for the increase in temperature in the environment of the probe.

For example, the fastener means can be made out of a magnetostrictive material. Magnetostrictive materials have the property of getting deformed under the action of a magnetic field. Magnetostrictive materials are generally synthesized compounds or ceramics. After the fastener means have been introduced into the holes of the wall, said fastener means can be mechanically deformed so that they are held in the holes of the wall of the aircraft. When the deformed fastener means are subjected to a magnetic field, they tend to recover their initial shape.

In a particular example of an embodiment of the invention, the creation of the magnetic field can be made to depend on an electromagnet mounted in a branch connection on an electrical circuit powering the probe itself. Thus, as soon as a probe is powered, the electric current modifies electrical properties of the electromagnet, thus creating a magnetic field.

The magnetic field enables the deformation of the magnetostrictive material forming the fastener means. The fastener means then resume their initial shape. Said initial shape, namely that shape before mechanical deformation, is such that the fastener means are no longer held in the holes of the wall. The protective cover can then fall to the ground, through gravity and/or the vibrations of the aircraft.

In another exemplary embodiment of the invention, the fastener means are each formed by a through-hole part, capable of crossing the wall, and a holding part that is independent of the through-hole part. During a mounting of the protection, the through-hole part is introduced into a hole of the wall. Then, the through-hole part is held in position by means of a holding part. For example, each through-hole part is provided, at the position of an end designed to cross the wall of the aircraft, with a housing capable of receiving a holding part. The holding part is introduced into the housing and maintains said through-hole part in the hole. For example, the holding part, once positioned in the housing, can extend in a direction perpendicular to the through-hole part. The holding part then comes into contact with an internal face of the wall of the aircraft, and prevents the through-hole part from sliding in the hole.

The protective cover can be withdrawn by hand through the exertion of a pulling force on said protective cover. For example, the housing made in the through-hole part is triangular. In other words, an internal volume of the housing is greater at a bottom end of said housing than at a top end. The holding part is, for example, cylindrical. The cylindrical shape may be contained in the volume of the bottom end of the housing but not in the volume of the top end of the housing. Pulling on the protection element modifies a position of the holding part in the housing, from the bottom end to the top end. Since the holding part is no longer positioned in the housing, the through-hole part is no longer held in the hole. The protective cover is thus separated from the wall.

The holding part may be sensitive to a magnetic field generated by an electromagnet. The electromagnet is mounted for example in a branch on a main electric current circuit powering an engine or the probe. Thus, as here above, when the engine or the probe is on, the electromagnet emits an electrical field. The holding part can then be attracted and drawn out of the housing made on the through-hole part. The through-hole part is no longer held in the housing, and the protective cover can fall to the ground.

The protective cover is constituted for example by a circular cylindrical tube. Generally, the protective cover consists of a hollow body having an internal volume sufficient to at least partially contain the probe to be protected. An upper face of the circular cylindrical tube, in contact with the wall of the aircraft, is provided with at least one detachable fastener means. It is possible to provide for several fastener means of the invention. For example, the protective cover may comprise two, three or four fastener means positioned evenly on a periphery of the upper face of the body of the device. It is possible to make a protective cover provided with several different detachable fastener means of the invention. For example, a first fastener means may be made of a magnetostrictive material, while a second means is made of a shape memory material. A third fastener means for its part may be provided with a holding part sensitive to a magnetic field and holding a through-hole part in a hole of the wall.

In order to prevent breakage of the protective cover when it falls to the ground, it is possible to make the protective cover out of a material, such as plastic, that is resistant to impact. Furthermore, when the fastener means comprise at least one part designed to go through the wall of the aircraft, it is possible to make the fastener means out of metal. Thus, the risk of wear and tear of these fastener means is reduced.

An object of the invention therefore is a device for the protection of a probe joined to an external wall of an aircraft, the device being capable of at least partially covering said probe and being provided with at least one detachable means of fastening to the wall, wherein the detachable fastener means are sensitive to a modification of temperature in an environment of the probe.

The probe protected by such a protective cover is, for example, an air-speed indicator probe, a clinometer probe, a thermometrical probe or a manometric probe.

In a particular example of an embodiment of the invention, the detachable fastener means comprise:

- at least one through-hole unit, the through-hole unit being joined by a bottom end to a body of the device, a top end of the through-hole unit being capable of being housed in a hole made in the wall,
- at least one holding element that can hold the top end of the through-hole unit in the hole.

According to different exemplary embodiments of the invention, the through-hole unit and the holding element may form one and the same part, or may be independent of each other.

In a particular example of an embodiment of the device of the invention, the through-hole unit is a peg, and the holding element is a pin, the pin being capable of being housed in a housing made at the position of a top end of the peg, at least the pin being sensitive to a magnetic field generated by an electromagnet during a heating of the probe.

It is then possible to provide for a polarization, or position of the pin such that the pin is drawn by attraction out of the housing when the electromagnet generates a magnetic field. At the same time, it is possible to provide for a polarization of the peg such that the peg is repulsed and pushed out of the hole of the wall when the electromagnet generates a magnetic field. Such a polarization of the peg enables the protection device to be thrown far from the wall of the aircraft. Thus even when the vibrations of the aircraft are insufficient if the weight of the protection device is too low, the protection device, when separated from the wall, falls to the ground.

In any case, it can be planned that the protection device will be capable of being mounted on and dismounted from the wall manually, or more generally mechanically. The sensitivity to heat of the one or more fastener means then makes it possible to cope with any oversight involving one or more protection devices on the wall.

BRIEF DESCRIPTION OF THE DRAWINGS

The invention will be understood more clearly from following description and the accompanying figures. The figures are given purely by way of an indication and in no way restrict the scope for the invention. Of these figures.

MORE DETAILED DESCRIPTION

Figure 1:
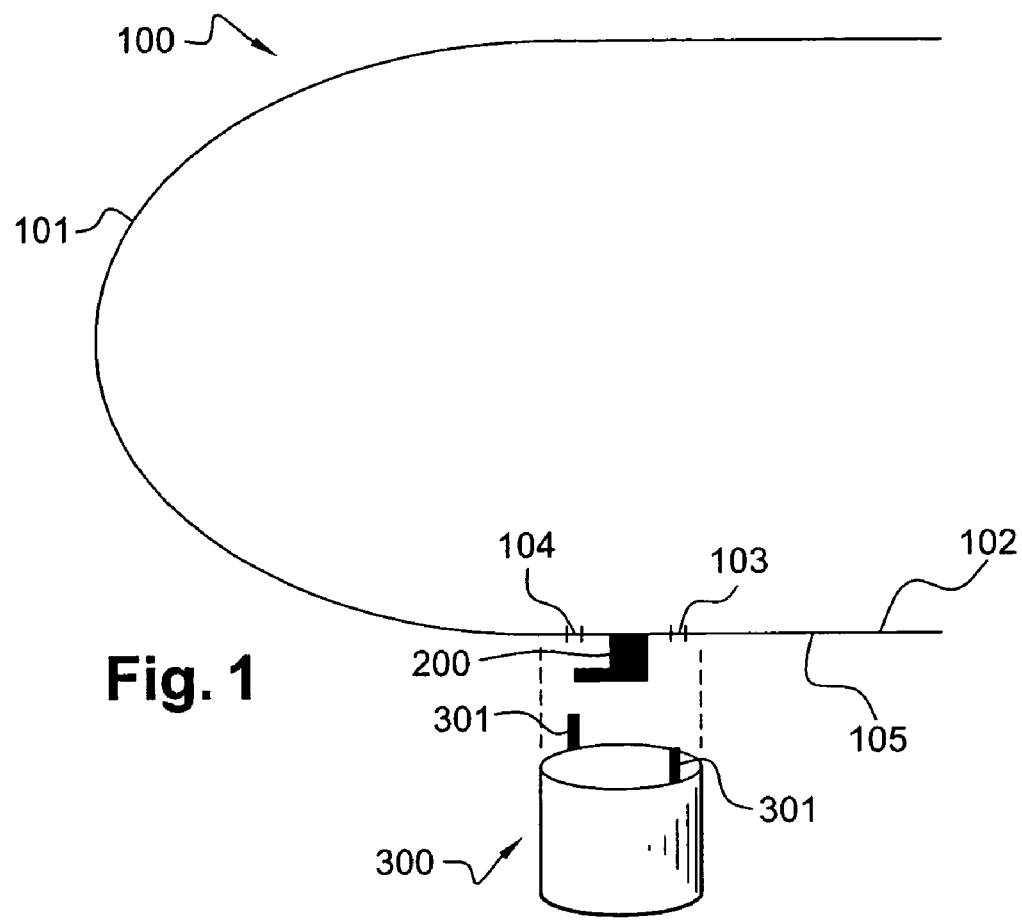
FIG. 1 is a diagrammatic view of a nose of an aircraft at the position of an external probe and of a protection device which could be that of the invention.

FIG. 1 is a diagrammatic view of a head 101 of an aircraft 100. A wall 102 of the aircraft 100 carries a probe 200 on an external face 105. The term "external face" is understood to mean the face located outside the aircraft 100. The wall 102 of the aircraft 100 is provided with two holes 103 and 104, on either side of the probe 200. The holes 103 and 104 are capable of receiving fastener means 301 of a device 300 for the protection of the probe 200.

Figure 2:
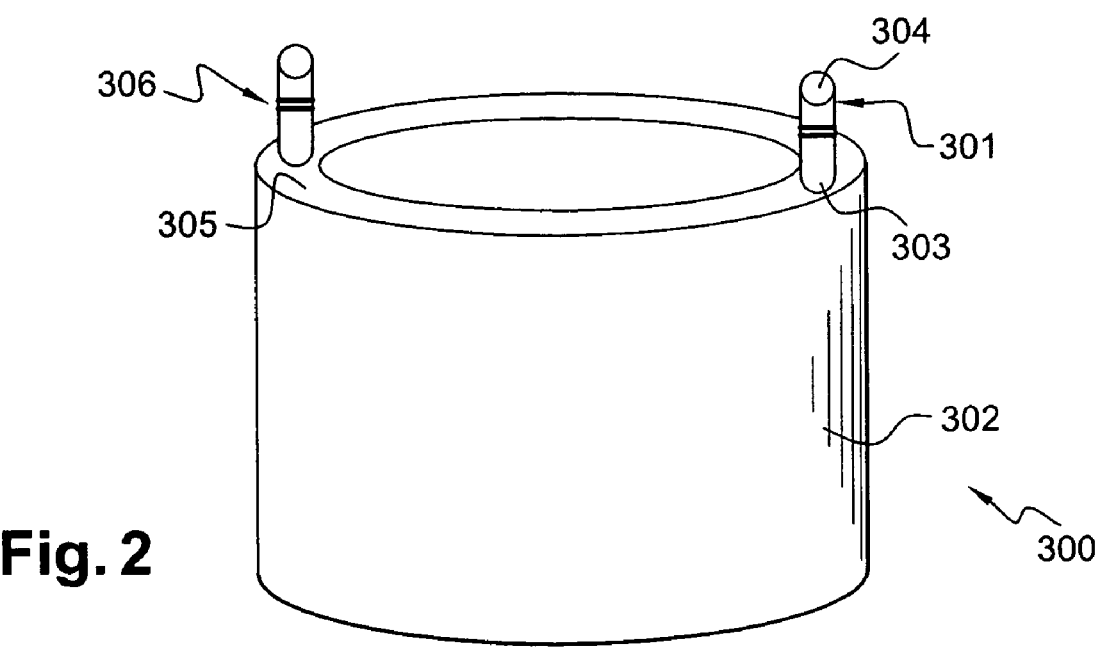
FIG. 2 provides a general view of a protection means which could be that of the invention.

FIG. 2 shows a more detailed review of the protection device 300. The protection device 300 has a body 302. The body 302 herein has a hollow cylindrical circular shape closed at one end. The probe 200 may be housed in the cylinder 302. The protection device 300 has two fastener means 306. The fastener means 306 are positioned on either side of the body 302. Each fastener means 306 has a through-hole unit 301. A bottom end 303 of the through-hole unit 301 is fixed to a wall 305 of the body 302 coming into contact with the external face 105 of the wall 102. A top end 304 of the through-hole unit 301 is capable of being housed in the hole 103 or 104 of the wall 102. The through-hole unit 301 may be held in the hole 103 or 104 by a holding element (not shown in FIG. 2) of the fastener means 306.

Figure 3:
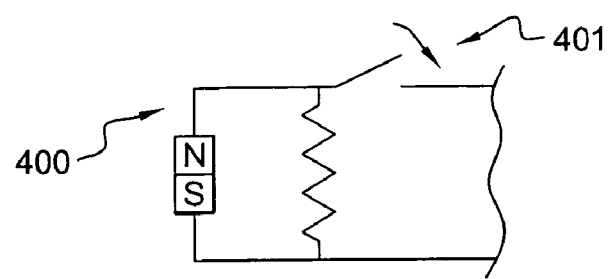
FIG. 3 provides a diagrammatic view of a protection device according to a particular example of an embodiment of the invention.

FIG. 3 shows a particular exemplary embodiment of the fastener means 306 according to the invention. The probe 200 is protected from the external elements by the body 302 of the protection device 300. For example, the probe 200 is a air-speed indicator probe. The protection device 300 is held on the wall 102 of the aircraft 100, around the probe 200, by detachable fastener means 306. The fastener means 306 are formed by a through-hole unit 301 and a holding element 307. The holding element 307 is a pin. The through-hole unit 301 is a peg.

When it is sought to protect the probe 200 from the exterior, the through-hole units 301 of the device 300 are introduced into the holes 103 and 104 made on the wall 102 of the aircraft 100. Each pin 307 is then positioned, for example manually, in a housing 308 made on the top end 304 of each through-hole unit 301. The housing 308 is for example a notch 308 in which the pin 307 can be at least partially inserted. The pin 307 has a length sufficient to abut an internal face 106 of the wall 102. The term "internal face" 106 of the wall 102 is understood to mean the face 106 located within the aircraft 100. Thus, when the pin 307 is in the notch 308, the peg 301 cannot come out of the hole 103 or 104.

The pin 307 is made of a material that can be sensitive to a magnetic field generated by an electromagnet 400 during a heating of the probe 200. One position of the pin 307 is such that that the pin is attracted and drawn out of the notch 308 when the electromagnet 400 generates a magnetic field.

In a particular example of an embodiment of the invention, it may be planned to make the through-hole unit 301 out of material that is also polarizable. In this case, the through-hole unit 301 can be made in such a way that a position of the through-hole unit 301 enables this through-hole unit 301 to be repulsed and pushed far from the electromagnet 400. Thus, the through-hole unit 301 is ejected out of the holes 103 and 104. This means that the protection device 300 is thrown out toward the ground.

The electromagnet 400 is mounted, for example, in a branch circuit on a main circuit 401 powering the probe 200. When the probe 200 is on, the current flows into the circuit powering the probe, as well as into the circuit of the electromagnet 400. The electromagnet 400 then generates a magnetic field. Conversely, when the probe is cut off, namely when the aircraft is on the ground for a long time, the electric circuit is open. The electromagnet then generates no magnetic field.

Figure 4:
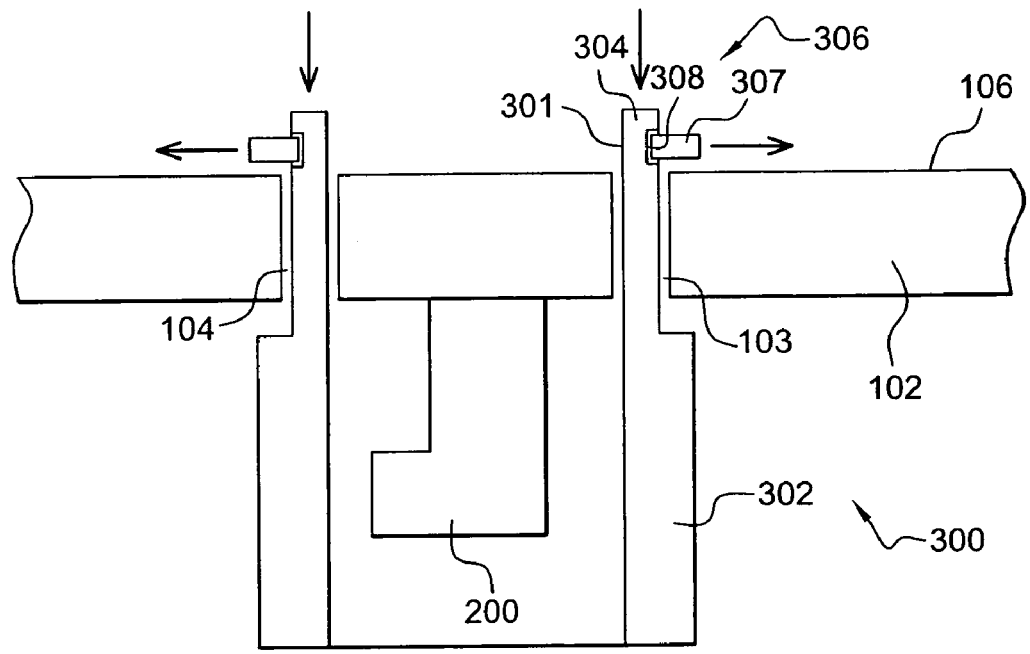
FIG. 4 provides a diagrammatic view of a protection device and the position of the fastener means according to an example of an embodiment of the invention.
Figure 4:
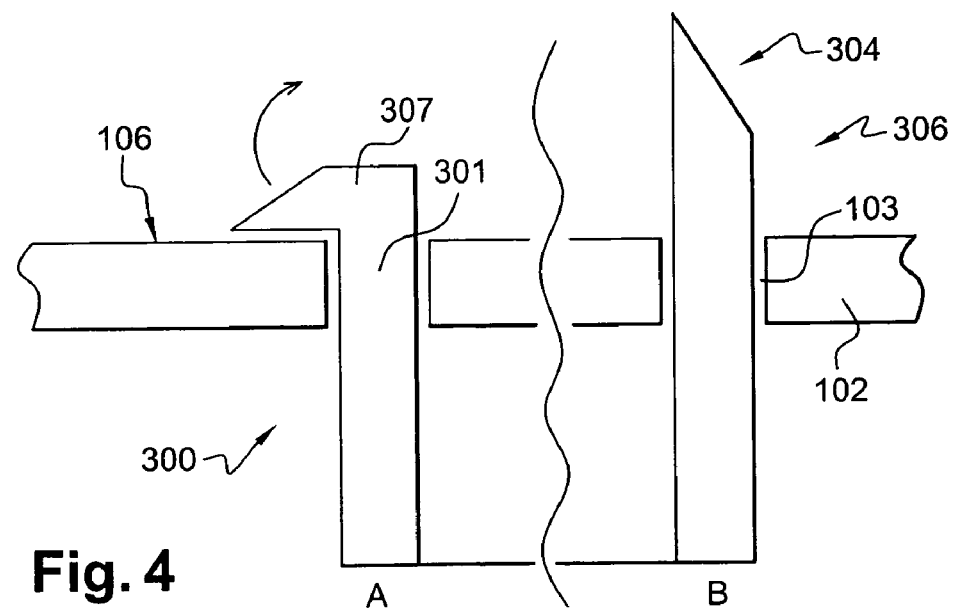

FIG. 4 shows another example of an embodiment of the fastener means 306 of the invention. In this example of an embodiment, each fastener means 306 is formed out of a shape memory material. The through-hole unit 301 and the holding element 307 are made in one piece. The fastener means 306 have an initial shape that is generally cylindrical (FIG. 4B). A cylindrical rod 306 is introduced into the hole 103 or 104 of the wall 102 of the aircraft 100, in order to protect the probe 200 (not shown) from the exterior. The top end 304 of the through-hole unit 301 is then deformed in order to impose a shape on the fastener means 306 that is suitable for it to be held on the interface 106. This mechanical deformation is achieved for example manually or by an appropriate tool. Thus, as shown in FIG. 4A, the top end 304 of the through-hole unit 301, once deformed, forms the holding element 307. The holding element 307 extends in a direction that is substantially perpendicular to the through-hole unit 301, namely in such a way that the through-hole unit 307 can rest on the internal face 106 of the wall 102 of the aircraft 100. The device 300 is then held on the wall 102 of the aircraft 100.

When a surrounding temperature of the probe 200 increases and crosses a threshold temperature of deformation of the alloy forming the fastening element 306, this fastening element 306 resumes its initial shape shown in FIG. 4B. The fastener means 306 are then no longer held in the holes 103 and 104. The protection device 300 is then no longer held on the wall 102. The device 300 falls for example to the ground, giving the external elements free access to the probe.

The example shown in FIG. 4 can also be applied to a fastener means 306 made out of a magnetostrictive material. In this case, the deformation by which the fastener means 306 can be detached from the wall 102, is obtained by subjecting the fastener means 306 to a magnetic field. The magnetic field may be generated in particular by an electromagnet (not shown) mounted as a branch circuit on a main electrical circuit powering the probe 200.

With the protection device 300 of the invention, it is possible to position the protection 301 around the probe 200 and remove it manually. However, should at least one protective cover 300 around a probe 200 be overlooked, said overlooked protective cover 300 gets automatically separated from the wall 102 and falls to the ground. This automatic separation is linked, directly or indirectly to the rise in temperature to which the probe 200 and the wall 102 of the aircraft 100 bearing the probe are subjected. Since the take-off of an aircraft 100 is always accompanied by an increase in the external temperature of the wall 102, due to the supply of the reheating of the probe, the protection device 300 is in any case withdrawn from the probe 200 at an early stage in the takeoff of the aircraft 100.

Thus, the associating of the automatic withdrawal of the protection with the rise in temperature eliminates any risk that the aircraft might prepare to take off while a protective cover is still surrounding a probe. This eliminates any risk of damage, for example by the melting of the device on the probe. This also eliminates any risk that the aircraft 100 might take off with the protective cover 300 thus preventing the probe 200 from working properly.

What is claimed is:

1. A device for the protection of a probe joined to an external wall of an aircraft, the device adapted to at least partially cover the probe, the device comprising:
    at least one detachable fastener means adapted to fasten to the wall sensitive to a modification of a temperature in an environment of the probe, wherein the fastener means comprise
        at least one through-hole unit, the through-hole unit coupled by a bottom end to a body of the device, a top end of the through-hole unit adapted to be housed in an aperture in the wall, and
        at least one holding element adapted to hold the top end of the through-hole unit in the aperture,
    wherein the fastener means are detachable according to modifications of the temperature in the environment of the probe.

2. A device according to claim 1, wherein the probe is a wind-speed indicator probe.

3. A device according to claim 1, wherein the probe is a thermometrical probe.

4. A device according to claim 1, wherein the probe is a thermometrical probe.

5. A device according to claim 1, wherein the probe is a manometric probe.

6. A device according to claim 1, wherein the fastener means comprises a magnetostrictive material, a shape of the fastener means in an absence of magnetic fields being such that the device is coupled to the wall, a shape of the fastening means in a presence of a magnetic field being such that the device is separated from the wall.

7. A device according to claim 1, wherein the fastener means comprises a shape memory, an initial shape of the fastener means being such that the device is separated from the wall, the fastener means adapted to be mechanically deformed so that the device is joined to the wall.

8. A device according to claim 1, wherein the device comprises at least two detachable fastener means positioned on either side of the body of the device.

9. A device according to claim 8, wherein the body of the device comprises plastic, the at least one though-hole unit and the at least one holding element comprising metal.

10. A device according to claim 1, wherein the through-hole unit is a peg and the holding element is a pin, the pin adapted to be housed in a housing formed at a top end of the peg, at least the pin being sensitive to a magnetic field generated by an electromagnet during a heating of the probe.

11. A device according to claim 10, wherein the magnetic field is operably generated by a magnetic circuit branched from a main electric circuit heating an environment of the probe.

12. A device according to claim 10, wherein one position of the pin is such that the pin is operably attracted and drawn out of the housing when the electromagnet generates a magnetic field.

13. A device according to claim 12, wherein one position of the peg is such that the peg is operably repelled and pushed out of the aperture of the wall when the electromagnet generates a magnetic field.

* * * * *

UNITED STATES PATENT AND TRADEMARK OFFICE
CERTIFICATE OF CORRECTION

| | | |
|---|---|---|
| PATENT NO. | : 7,175,344 B2 | Page 1 of 1 |
| APPLICATION NO. | : 11/017620 | |
| DATED | : February 13, 2007 | |
| INVENTOR(S) | : D'Ouince et al. | |

It is certified that error appears in the above-identified patent and that said Letters Patent is hereby corrected as shown below:

Column 2, line 33:

After "C" delete ".".

Column 8, line 26:

Delete "thermometrical" and insert --clinometrical--.

Signed and Sealed this

Twenty-fifth Day of September, 2007

JON W. DUDAS
*Director of the United States Patent and Trademark Office*